United States Patent Office 2,863,983
Patented Dec. 9, 1958

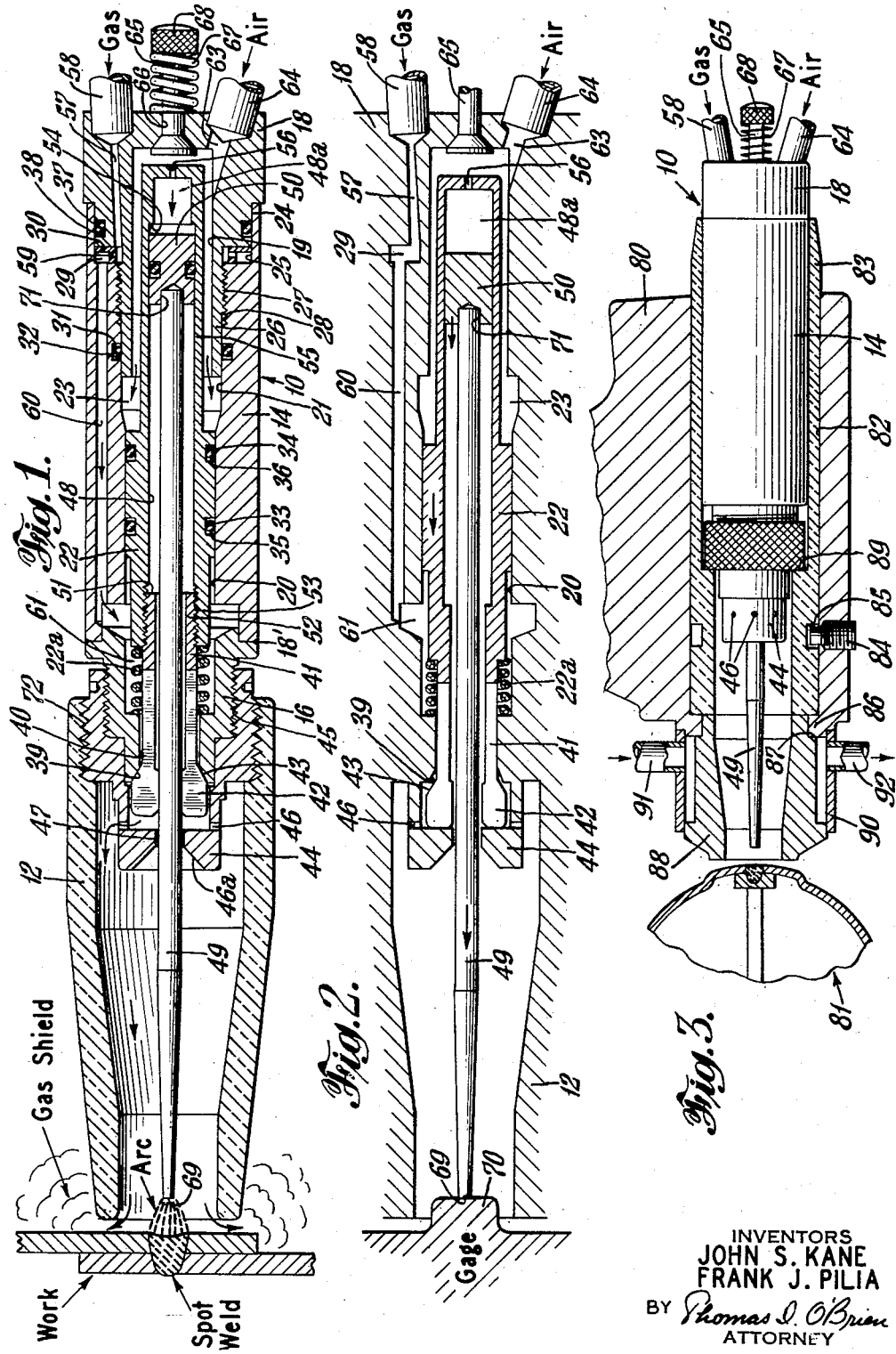

2,863,983

GAS SHIELDED ARC WELDING TORCH

John S. Kane, Watchung, and Frank J. Pilia, West Orange, N. J., assignors to Union Carbide Corporation, a corporation of New York Application January 19, 1956, Serial No. 560,117

11 Claims. (Cl. 219—75)

This invention relates to gas shielded arc welding torches adapted to hold an electrode at a predetermined distance from the work to strike an arc with the work, and to project a stream of gas to envelop and shield the arc. The invention is particularly directed to a torch employing an electrode of non-consumable material, such as tungsten, for example, and to new combinations of torch and torch mountings.

The success of welding operations depends to a large degree on the maintenance of proper distance between the work and the tip of the electrode. The distance is variable and depends on particular welding conditions. It is extremely important to maintain a close tolerance on said distance during operations. For example, in certain spot-welding operations, the distance varies between .057" and .080". Although the electrode may be of the "non-consumable" type, erosion does occur and periodic adjustment of the electrode to work distance must be made. This electrode adjustment has heretofore been a time-consuming operation commonly requiring manual adjustment of torch components to effect the adjustment.

The primary object of this invention is the provision of new and useful improvements in gas shielded arc welding torches, and particularly to electrode holding systems for such torches, by which electrodes may be mechanically adjusted in the torch to obtain proper spacing between the work and the electrode.

A more particular object of this invention is to provide power-operated electrode adjusting apparatus for a gas shielded arc welding torch. A special feature of the invention lies in its compact organization, by which power-operated apparatus may be associated with electrode holding apparatus in a unitary arrangement without increasing the space requirements of the torch.

Another object of the invention is to provide new and improved torch body assemblies and torch holder assemblies and new combinations thereof, particularly adapted for use in mass production assemblies, characterized by compactness and easy interchangeability of torch body assemblies for repair and replacement of faulty torch body assemblies.

According to one aspect of this invention, a gas shielded arc welding torch embodying the improved features of the present invention has an elongated body formed with an internal cavity, an electrode holder movable in said cavity between an open position in which the electrode in the holder is released and a closed position in which the electrode is gripped, power-operated means for controlling the movement between said positions, and other power operated means operable to move an electrode in the holder relative to the holder when the latter is in its open position. The body includes respective fluid-pressure operated means in driving relation to the holder and to an electrode in the holder that are movable relative to each other for effecting movement of the holder to its open position and movement of the electrode outwardly relative to the holder when the electrode is released by the holder. The holder driving means is adapted to be connected to a supply line for leading pressure fluid to and from such means on its working and return strokes, respectively, and the electrode driving means has fluid communication with the holder driving means so as to effect fluid pressure loading and unloading of the electrode driving means when pressure fluid is led to and from the holder driving means. The fluid communication between the electrode driving means and the holder driving means is preferably restricted to limit the pressure build-up on the former means so as to effect operation of the two means in predetermined sequence.

In the preferred form of the invention, the torch body includes a main or first fluid pressure cylinder adapted to be connected to a source of pressure fluid and containing a reciprocating main piston member in driving relation to the holder. The main piston member itself is hollow and is formed internally as a second fluid pressure cylinder having (1) a reciprocating second piston therein in driving relation to an electrode in the holder and (2) a restricted orifice opening into the first fluid pressure cylinder to admit pressure fluid to the second cylinder from the first cylinder and to discharge pressure fluid from the second cylinder to the first cylinder at predetermined restricted rates so as to delay momentarily the action of the electrode driving second piston relative to the holder driving main piston. In this way there is little wear on either the electrode or the holder, for the time delay allows movement of the holder to an open position before the electrode is moved relative thereto, thus avoiding rubbing between the two members.

The arc torch body assembly of this invention can have a gas shielding and directing nozzle detachably connected thereto to form a completely integrated torch, or it can be mounted in an improved torch holder having a nozzle component adapted for cooperatively associating with the torch body to form therewith an operative gas shielded arc torch. In this particular aspect of the invention, the torch holder comprises a container having an opening extending therethrough which is formed at one end thereof as a gas directing and shielding nozzle. The remainder of the container opening is lined with an axially fixed, tubular, electrically insulating liner. The torch body assembly is inserted into the open end of the liner opposite the nozzle, and has an outwardly directed means cooperating with inwardly directed means on the liner for limiting the axial movement of torch body in one direction relative to the container to a position in which the baffle cap at the electrode receiving end of the torch body projects into the nozzle portion of the holder. The torch holding contact is provided with a cooling system for removal of heat from the nozzle portion thereof. This combination provides an arc torch system that allows easy removal and replacement of faulty torch bodies from working assemblies, for it facilitates proper positioning of the torch relative to the work and it eliminates the need for disconnecting and reconnecting cooling water hose connections on the outgoing and incoming torch body. It also eliminates the need for an individual nozzle for each torch body in the manufacture of such bodies.

These and other features, advantages and objects of the invention will become apparent from the following detailed description of the accompanying drawings which are merely exemplary and in which:

Fig. 1 is a longitudinal cross section of a gas shielded arc welding torch embodying the present invention and showing electrode holding components in normal operating position;

Fig. 2 is a diagrammatic illustration of the torch of Fig. 1, showing the electrode holding components in open position for electrode adjustment; and Fig. 3 is a view, partly in elevation and partly in section, of an assembly of a torch body and a torch holder according to the invention.

Figure 1 shows a gas shielded arc welding torch unit comprising a torch body assembly, indicated generally at 10, and a gas directing nozzle 12 detachably mounted on the front end thereof. This torch unit is for general application; it is readily adaptable for use manually or with mechanical torch holders. The torch body assembly comprises an electrode holder metal barrel made up of a hollow cylindrical member 14 and a hollow front piece 16 which is fitted and secured to the forward end of member 14 as by welding 18'. The hollow cylindrical member 14 has a central longitudinally extending through bore 20 which is enlarged rearwardly at 21 and which has slidably mounted in its forward portion a plunger 22. The back end of member 14 is closed by a plug 18 serving as a current, gas, and air supplying head. The head 18 is a metal block having a central cavity 19 that opens forwardly into the bore 20 and forms with the bore a fluid pressure chamber 23 in which plunger 22 constitutes a piston. Head 18 has a cylindrical forward section 24, which slidably fits into a counterbore 25 at the back end of member 14, and an annular collar 26 which projects forwardly from section 24 and is received into the enlarged portion 21 of the bore 20. Collar 26 has a threaded rear portion 27 adapted to enter an internally threaded portion 28 of bore 20. The length of the cylindrical section 24 of the head 18 is shorter than the depth of counterbore 25, so that when the head 18 is fitted into the barrel, an annular gas receiving and distributing channel 29 is formed. An annular metal spacer 30 having good electric conductivity is disposed in channel 29 in abutting relation to both the head 18 and the barrel 14 to form a path of little resistance for leading current from the head to the barrel for subsequent passages to the electrode. This prevents or minimizes arcing across the threaded surfaces 27 and 28 on the head and barrel.

The enlarged part 21 of bore 20 has an inner annular groove 31 in front of threaded portion 28 which is adapted to receive an O-ring 32. The O-ring is positioned to be compressed by the forward, unthreaded portion of collar 26 when the head is inserted into the barrel 14 so as to form a gas-tight seal between the fluid pressure chamber 23 and the gas-receiving annular channel 29. O-rings 33 and 34 disposed respectively in axially spaced external annular grooves 35 and 36 in the plunger 22 engage the inner surface of bore 20 in compressing relation to form a gas-tight seal for preventing the escape of air from the fluid pressure chamber 23 forwardly into the shielding gas passages in the front end of the barrel. A gas-tight seal is also formed on the rear side of annular channel 29 by an O-ring 37 seated in an annular groove 38 in the cylindrical section 24 of the head 18 which engages the side wall of counterbore 25.

The front outer face of the barrel member 16 has an internally conical surface 39 surrounding a central opening 40 that is adapted to receive therethrough an electrode gripping collet 41. The collet has a stem portion extending through the opening and detachably connected at its rear end to the plunger 22 for movement therewith. The forward portion of the collet stem tapers outwardly at 43 to an enlarged head 42 having a diameter sufficiently large to prevent passage of the head through opening 40. The collet is grooved axially in the usual manner from the front end thereof at least to an intermediate part that lies inside the barrel, and the internally conical surface 39 on the barrel serves as a seat for the tapered or externally conical surface 43 on the collet. A spring 22a inside the barrel continuously biasses the plunger and collet rearwardly to hold the collet normally in a seated closed position, the wedging action resulting from contact of tapering surface 39 of the barrel and the corresponding surface 43 of the head ensures closure of the jaws of the collet. A baffle cap 44 detachably secured to the front end of the barrel, as by a threaded plug and socket connection indicated at 45, encloses the protruding head 42 of the collet 43, but provides sufficient clearing between the cap and the forward end of the collet to permit axial movement of the collet between its seated closed position and a forward open position. Radial grooves 46 are provided in the cap 44 to direct shielding gas perpendicularly to the inner wall of the gas directing nozzle. By so directing the gas, a curtain of laminar flow is obtained and jetting is avoided. The cap also shields the collet to prevent deposition thereon of matter thrown out into the nozzle 12 during welding operations. The cap also has a front surface 46a, tapering inwardly toward a central opening 47. The tapered surface facilitates the insertion of an electrode into the barrel, and the opening itself serves as a guide for the electrode.

The plunger 22 has a cylindrical cavity 48 formed therein which is open forwardly to receive an electrode, indicated at 49. Cavity 48 contains a piston 50 which divides the cavity and forms a gas-tight chamber 48a in back of the piston. Piston 50 has a front face adapted to abut the back end of an electrode received into the collet 41 and plunger 22. Forward movement of the piston is limited by an annular seat 51 formed on the back end of a threaded plug portion 52 of collet 41 which is received into a threaded socket portion 53 of plunger 22. Rearward movement of piston 50 is limited by an internal annular shoulder 54 near the back end of chamber 48a. The plunger 22 has a stepped rearward extension 55 which has a small orifice 56 in the back end thereof which forms a fluid connection between chambers 23 and 48a for leading air under pressure from the chamber 23 to chamber 48a on the working stroke of the plunger 22 and from the chamber 48a to chamber 23 on the return stroke of plunger 22 at a predetermined controlled rate. It will be seen that when an electrode is inserted into the barrel, it abuts against piston 50 and moves the same rearwardly to a position such as shown in Fig. 1. When the electrode is released from the collet and air under pressure is admitted into the back end of chamber 48a, it acts to force the piston forwardly, moving the electrode outwardly of the barrel and collet.

The current, gas and air supplying head 18 contains a bore 57 which receives a metal tube 58 constituting both a welding current conductor and a shielding gas supply conduit. Current is supplied to the head and passes through the head and metal barrel and is delivered into the electrode at the forward end of the torch through the collet 41 which serves to electrically connect the barrel to the electrode when the collet is seated against the barrel and is gripping the electrode. Shielding gas entering bore 57 by way of tube 58 is led to the annular chamber 29 and passes through radial bores 59 in the spacer 30 into a longitudinal passage 60 in the member 14a. This delivers the gas to the annular chamber 61 surrounding the back end of the collet 41 and from which the gas passes through the axial slots of the collet and thence through radial apertures 46 in the baffle cap 44 into the interior of the nozzle 12.

Chamber 23 is connected by way of a passage 63 in the head with a supply line 64 selectively connectable to a source of air under pressure (not shown) and a vent (not shown) for leading air under pressure to and from chamber 23.

In order to release the collet without loading the electrode-driving piston 50 inside the collet-carrying plunger 22 for removing and replacing an electrode in the barrel, a small depressible plunger 65 is fitted into an opening 66 in the back end of the head in position to displace plunger 22 forward when depressed. The plunger 65 comprises a cone-head cap screw, the head of which is continuously urged toward a seated position on a tapered surface surrounding the inner mouth of opening 66 by a spring 67 pressing rearwardly on a nut 68, so as to maintain the opening 66 normally closed.

In operation, the electrode 49 is held axially stationary by the gripping jaws on head 42 of collet 41, with the tip 69 of the electrode set at a predetermined distance from the work. With reference now particularly to Fig. 2, adjustment of the electrode to its correct position for proper setting of the electrode tip is accomplished in accordance with the present invention as follows. After a gage block 70 has been set in position in the mouth of the nozzle 12, air under pressure is admitted into chamber 23 by way of conduit 64 and passage 63 in the head 18. This causes the plunger 22 to move forwardly, overcoming the action of spring 22a and moving the collet 41 to its open position in which electrode 49 is released. Air under pressure is also admitted at the same time but at a slower rate into chamber 48a inside plunger 22 by way of orifice 56. The slight delay allows the collect to be moved to open position before the pressure in chamber 48a has been built up sufficiently to move piston 50. With the collet 41 in open position, piston 50 is operative in response to the pressure in chamber 48a to move the electrode 49 outwardly of the barrel and collet until the forward tip 69 strikes the gage block 70. This sets the electrode at the correct position, and pressure in chamber 23 is released through passage 63 and conduit 64 to permit spring 22a to press the plunger 22 backward until the collet is seated in its closed, electrode-gripping position. At the same time, air pressure is released from chamber 48a but at a slower rate so as to hold the electrode in its set position until the collet reaches closed position. This sequential action avoids rubbing of the collet against the electrode, thus minimizing wear in the collet. The front face of piston 50 is formed with a central recess 71 for receiving the back end of the electrode. This effects a rearward support for the electrode which, together with the support given at the forward end of the torch by the baffle cap, maintains axial alignment of the electrode when it is released by the collet, thus insuring abutting of the electrode normal to the gage block 70.

The arc torch body assembly 10 of Fig. 1 can have a gas directing nozzle attached to the front end thereof, as shown in Fig. 1 wherein a nozzle 12 of ceramic or other refractory material is threadedly secured at 72 to the baffle cap 44, but it is especially suited for assembly in an improved torch holder as exemplified in the embodiment shown in Fig. 3. The improved torch holder comprises a container 80 adapted to be mechanically held in fixed relation to the work, indicated at 81. Container 80 has a longitudinal bore 82 extending therethrough which receives an electrically insulating, cylindrical liner 83. Liner 83 is fixed axially in the container by a set screw 84 protruding into groove 85 on the liner. The container, at the side of the bore 21 facing the work, is formed with an annular flange 86 directed radially inward to engage against an external shoulder 87 formed on a nozzle member 88 that is fitted into the front end of the container. The liner 83 has an internal annular shoulder 89 intermediate its ends which acts to seat a torch body 10 received thereinto in operating position. The portion of the liner in front of shoulder 89 has an inner wall which forms a continuing surface with the inner wall of nozzle member 88, and together with such nozzle member constitutes a gas directing nozzle for the torch. The nozzle member 88 is provided with a surrounding water jacket 90 having inlet 91 and outlet 92 for circulating a coolant through the jacket to remove heat from the torch in the vicinity of the arc. It will be seen that the torch holder provides a permanent gas directing nozzle having fixed cooling connections and that once the holder is set up for a particular job, a torch body assembly of the present invention can be set in operating position merely by inserting the body into the container liner. A readily releasable clamp (not shown) will be secured to the projecting head 18 of the body assembly to prevent movement of the assembly relative to the holder. The facility with which the electrode can be adjusted in the torch holder without removal of torch components, and with which interchangeable torch bodies containing the electrode holder and the current and gas supplying components can be removed from and replaced in operating position, renders the apparatus of the present invention especially suited to mass production techniques.

It is to be understood that the detailed description and the accompanying drawings are illustrative and that improvements herein disclosed may be embodied in various forms of construction within the scope of this invention as defined in the following claims.

What is claimed is:

1. A gas shielded arc torch comprising an elongated body having an axially extending cavity formed therein, an electrode holder formed to telescopically receive an electrode and being movable in said cavity between a first position gripping an electrode in the holder and a second position at which an electrode in the holder is released, yieldable means for applying a force urging the holder toward one of said positions, power-operated means connected with said holder for applying a force overbalancing the force of said yieldable means so as to urge the holder toward the other of said positions, and other power-operated means positioned to act upon an electrode in the holder for moving it relative to the holder when the latter is in said second position.

2. A gas shielded arc torch comprising an elongated body having an axially extending cavity formed therein, a plunger slidably arranged in said cavity and forming with a portion thereof a chamber, an electrode holder formed to telescopically receive an electrode, said holder being mounted on said plunger for movement therewith between a first position gripping an electrode in the holder and a second position at which an electrode in the holder is released, yieldable means for applying a force against the plunger urging it and the holder toward one of said positions, said plunger having a face responsive to fluid pressure in said chamber for applying a force in counteraction to the force of said yieldable means to urge the plunger and holder toward the other of said positions, fluid pressure operated means operable to move an electrode in said holder relative to said plunger and holder when said plunger and holder are in said second position.

3. A gas shielded arc torch comprising an elongated body having an axially extending cavity, a plunger slidably arranged in said cavity and forming with a portion thereof a chamber, said plunger having an axially extending cavity opening at one end thereof, an electrode holder mounted on said plunger at said one end and formed to telescopically receive an electrode in the holder and the cavity of the plunger, said plunger and holder being movable between a first position gripping an electrode in the holder and a second position at which an electrode in the holder is released, yieldable means for applying a force against the plunger urging it and the holder toward one of said positions, said plunger having a face responsive to fluid pressure in said chamber for applying a force in counteraction to the force of the yieldable means to urge the plunger and holder toward the other of said positions, said plunger having a piston slidably freely in its cavity and forming with the closed end of the cavity a chamber, said piston being movable in response to fluid pressure in the plunger chamber into abutting relation with the end of an electrode in the plunger cavity so as to cause the electrode to be moved relative to the holder when said plunger and holder are in said second position.

4. A gas shielded arc torch body assembly comprising an elongated body having an axially extending cavity therein, an electrode holder formed to receive telescopically an electrode and being movable in said cavity between a closed position at which an electrode therein would be gripped and an open position at which the electrode would be released, respective fluid pressure operated means in driving relation to the holder and to an electrode in the holder for effecting movement of the holder to its open position and movement of an electrode outwardly relative to the holder when the electrode is released by the holder, the holder driving means having a connection with a supply line for leading pressure fluid to and from such means on the working and return strokes thereof, respectively, and the electrode driving means having fluid communication with the holder driving means so as to effect fluid pressure loading and unloading of the electrode driving means when pressure fluid is admitted to and discharged from the holder driving means, respectively.

5. A gas shielded arc torch body assembly comprising an elongated body having an axially extending cavity therein, an electrode holder formed to receive telescopically an electrode and being movable in the cavity between a closed position at which an electrode therein would be gripped and an open position at which the electrode would be released, yieldable means continuously urging the electrode holder toward its closed position with a predetermined force, respective fluid pressure operated means in driving relation to the holder and to an electrode in the holder operative with a force overbalancing the force of said yieldable means to move the holder to its open position and to move the electrode outwardly relative to the holder when the electrode is released by the holder, the holder driving means having a connection with a supply line for leading pressure fluid to and from such means on the working and return strokes thereof, respectively, and the electrode driving means having fluid communication with the holder driving means so as to effect fluid pressure loading and unloading of the electrode driving means when pressure fluid is admitted to and discharged from the holder driving means, respectively.

6. A gas shielded arc torch body assembly comprising an elongated body having an axially extending cavity therein, an electrode holder formed to receive telescopically an electrode and being movable in said cavity between a closed position at which an electrode therein would be gripped and an open position at which the electrode would be released, respective fluid pressure operated means in driving relation to the holder and to an electrode in the holder for effecting movement of the holder to its open position and movement of an electrode outwardly relative to the holder when the electrode is released by the holder, the holder driving means having a connection with a supply line for leading pressure fluid to and from such means on the working and return strokes thereof, respectively, and the electrode driving means having a fluid connection with the holder driving means to effect fluid pressure loading and unloading of the electrode driving means when pressure fluid is admitted to and discharged from the holder driving means, respectively, said connection including a flow constrictor limiting to a predetermined rate the flow of pressure fluid to and from the electrode driving means.

7. A gas shielded arc torch body assembly comprising an elongated body having an axially extending cavity therein, an electrode holder formed to receive telescopically an electrode and being movable in said cavity between a closed position at which an electrode therein would be gripped and an open position at which the electrode would be released, yieldable means continuously urging the electrode holder toward its closed position with a predetermined force, a first fluid pressure cylinder containing a main reciprocating piston connected with the holder operative with a force overbalancing the force of said yieldable means to move the holder to its open position, said cylinder having a connection with a supply line leading fluid pressure to and from said cylinder on the working and return strokes thereof, respectively, said main piston being hollow and forming internally a second fluid pressure cylinder having a reciprocating second piston in driving relation to an electrode in the holder and a restricted orifice opening into the first fluid pressure cylinder.

8. A gas shielded arc torch body assembly comprising an elongated body having an axially extending cavity, a plunger slidably arranged in the cavity and forming with a rearward portion thereof fluid-tight chamber, said plunger having an axially extending bore forming a recess opening at the forward end of the plunger to receive an electrode, said plunger carrying at its forward end a collet through which the electrode received into said bore passes, cooperative means on said body and said collet engageable for limiting axial movement of said collet in a rearward direction relative to the body and for concomitantly urging the collet toward a closed position in which an electrode therein would be gripped, yieldable means urging said plunger rearwardly so as to hold said collet in its closed position, said plunger being movable forwardly in response to fluid pressure in said chamber to move the collet forwardly so as to disengage said cooperating means and effect release of an electrode by the collet, said plunger having a piston slidably arranged for free movement in the bore thereof, said piston forming with the rearward end of the recess in the plunger a fluid-tight chamber, said piston being movable in response to fluid pressure in the chamber within the plunger into abutting relation with the end of an electrode received in the plunger bore so as to cause the electrode to be moved forwardly relative to the collet when said collet is disengaged from said electrode.

9. In combination, a gas shielded arc torch holder including a container having an opening extending therethrough, said opening being formed along a portion of its length at one end as a gas directing and shielding nozzle and containing an axially fixed hollow liner of electrically insulating material extending along another portion of its length to receive the torch body, a torch body assembly having a baffle cap at the electrode receiving end of the torch body for directing shielding gas radially outwardly of the torch body, said body assembly being removably arranged in the liner, cooperative means on the body assembly and the liner engageable for limiting axial movement of the torch body in one direction relative to the container to seat the body in a position in which the baffle cap projects into the back end of the nozzle portion of the container.

10. In a combination as defined in claim 9, including means for cooling the nozzle portion of said container.

11. In a combination as defined in claim 9, wherein said torch body assembly includes power operated means for adjusting the axial position of an electrode held therein from a position outside the torch and the container.

References Cited in the file of this patent

UNITED STATES PATENTS

| | | |
|---|---|---|
| 2,358,826 | Purat | Sept. 26, 1944 |
| 2,673,278 | Anderson | Mar. 23, 1954 |
| 2,798,145 | Vogel | July 2, 1957 |